(12) United States Patent
Sue et al.

(10) Patent No.: US 8,573,078 B2
(45) Date of Patent: Nov. 5, 2013

(54) SYSTEM AND METHOD FOR POSITIONING A SENSOR

(75) Inventors: Peter Ping-Liang Sue, Greer, SC (US); Holly Renae Davis, Greenville, SC (US); Tomasz Ryszard Szmigiel, Jablonna (PL); Piotr Edward Kobek, Warsaw (PL)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 12/952,316

(22) Filed: Nov. 23, 2010

(65) Prior Publication Data

US 2012/0125131 A1      May 24, 2012

(51) Int. Cl.
*G01D 21/00* (2006.01)
(52) U.S. Cl.
USPC ........................................ 73/866.5; 73/865.8
(58) Field of Classification Search
USPC ................................ 73/866.5, 865.8; 24/428
See application file for complete search history.

(56) References Cited

U.S. PATENT DOCUMENTS 7,578,210 B2 *   8/2009   Sciulli et al. ................. 73/866.5

OTHER PUBLICATIONS

Powerpoint image of sensor fitting in public use or sold prior to Nov. 18, 2009.

* cited by examiner

*Primary Examiner* — Hezron E Williams
*Assistant Examiner* — Rodney T Frank
(74) *Attorney, Agent, or Firm* — Dority & Manning, PA

(57) ABSTRACT

A system for positioning a sensor through an inner barrier and an outer barrier includes a first collar configured for engagement with the inner or outer barriers, a collapsible coupling, and a sensor support connected to the collapsible coupling. The collapsible coupling or the sensor support is in sealing engagement with the first collar, and the first collar, collapsible coupling, and sensor support define a passage therethrough. A method for positioning a sensor includes engaging a first collar to at least one of the inner barrier or the outer barrier and inserting a sensor support connected to a collapsible coupling through the outer barrier. The method further includes connecting the sensor support or the collapsible coupling to the first collar and inserting the sensor through the sensor support.

18 Claims, 4 Drawing Sheets

SYSTEM AND METHOD FOR POSITIONING A SENSOR

FIELD OF THE INVENTION

The present invention generally involves a system and method for positioning a sensor. In particular, embodiments of the present invention may provide a system and method for positioning a sensor that passes through multiple barriers that may move with respect to one another.

BACKGROUND OF THE INVENTION

Compressors, turbines, other forms of commercial equipment frequently generate and utilize fluids having a high temperature and/or pressure. For example, a typical gas turbine includes a compressor at the front, one or more combustors radially disposed about the middle, and a turbine at the rear. Ambient air enters the compressor, and rotating blades and stationary vanes in the compressor progressively impart kinetic energy to the working fluid (air) to increase the pressure of the working fluid and bring it to a highly energized state. The compressed working fluid flows to one or more combustors which mix fuel with the compressed working fluid and ignite the mixture to produce combustion gases having a high temperature and pressure. The combustion gases exit the combustors and flow along a hot gas path through the turbine. One or more casing(s) generally surround the turbine to contain and direct the combustion gases through alternating stages of fixed nozzles and rotating buckets. The rotating buckets may be attached to a rotor so that expansion of the combustion gases flowing through the turbine stages causes the buckets, and thus the rotor, to rotate to produce work.

During testing, maintenance, and operations, it is often desirable or necessary to monitor or measure conditions or components inside the commercial equipment. For example, an optical probe may be used to monitor vibrations, clearances, oscillations, or other parameters of the rotating blades in the compressor or the rotating buckets in the turbine. Similarly, a temperature sensor, pressure sensor, or other instrument may be inserted to monitor temperatures, pressures, and other internal parameters of the working fluid in the compressor or the hot gas path in the turbine. In each case, the particular instrument must generally be positioned at a precise location so that it is close enough to the component being monitored without contacting, rubbing against, or otherwise interfering with the rotating components.

In many cases, the instrument must pass through openings in an inner and/or outer casing to reach the component being monitored. Inasmuch as the inner and/or outer casings may expand at different rates and by different amounts, the size of the openings through the casings must be larger than the instrument so that radial and/or axial expansion of the casings does not cause the casings to interfere with the position of the instrument. Specifically, as the casings expand or contract, contact between the casings and the instrument may shift the position of the instrument, affecting the accuracy of the instrument and/or causing contact between the instrument and rotating components. However, increasing the size of the openings to accommodate expansion and contraction of the casings creates additional space between the openings and the instrument. The additional space between the openings and the instrument may allow excessive amounts of working fluid or combustion gases to leak past the inner casing, causing excessive heat and/or damage to components outside of the inner casing. Therefore, a system and method that allows for accurate placement of the instrument through one or more casings without allowing excessive amounts of fluid or gases to leak through the casings would be useful.

BRIEF DESCRIPTION OF THE INVENTION

Aspects and advantages of the invention are set forth below in the following description, or may be obvious from the description, or may be learned through practice of the invention.

One embodiment of the present invention is a system for positioning a sensor through an inner barrier and an outer barrier. The system includes a first collar configured for engagement with at least one of the inner barrier or the outer barrier, a collapsible coupling, and a sensor support connected to the collapsible coupling. At least one of the collapsible coupling or the sensor support is in sealing engagement with the first collar, and the first collar, collapsible coupling, and sensor support define a passage therethrough.

An alternate embodiment of the present invention is a system for positioning a sensor through an inner barrier and an outer barrier that includes a first collar configured for engagement with at least one of the inner barrier or the outer barrier. A sensor support is connected to the first collar, and the first collar and sensor support define a passage therethrough. The system further includes means for allowing movement between the sensor support and the first collar.

The present invention may also include a method for positioning a sensor through an inner barrier and an outer barrier. The method includes engaging a first collar to at least one of the inner barrier or the outer barrier and inserting a sensor support connected to a collapsible coupling through the outer barrier. The method further includes connecting at least one of the sensor support or the collapsible coupling to the first collar and inserting the sensor through the sensor support.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
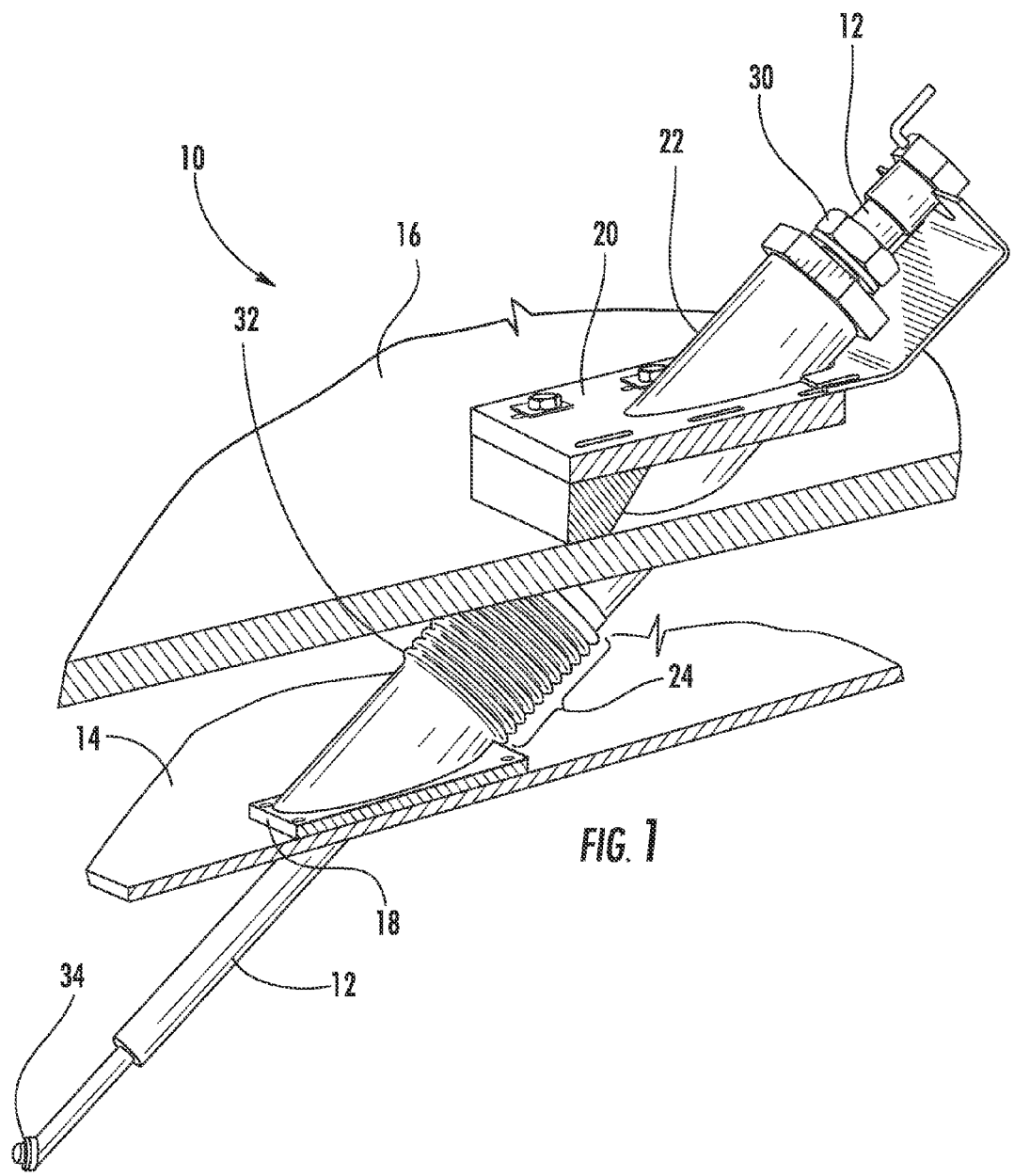
FIG. 1 is a perspective view a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system 10 and method for positioning a sensor 12 through an inner barrier 14 and an outer barrier 16 of a machine. Although embodiments of the present invention may be described in the context of a compressor or a turbine having an inner and outer casing, one of ordinary skill in the art will appreciate that embodiments of the present invention may be adapted for use with virtually any machine, and the present invention is not limited to any particular machine unless recited in the claims.

Figure 2:
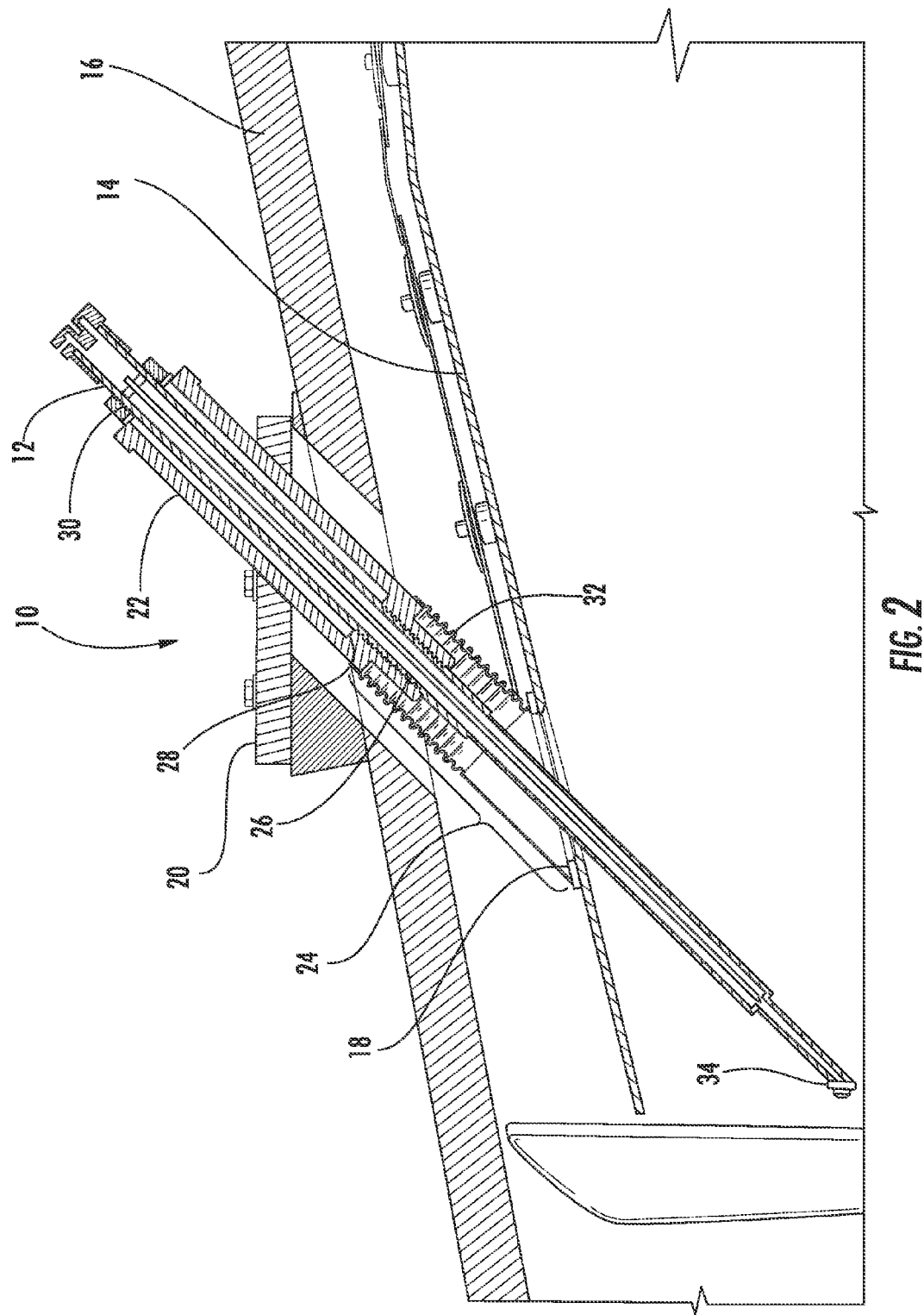
FIG. 2 is a side cross-section view of the system shown in FIG. 1.
Figure 3:
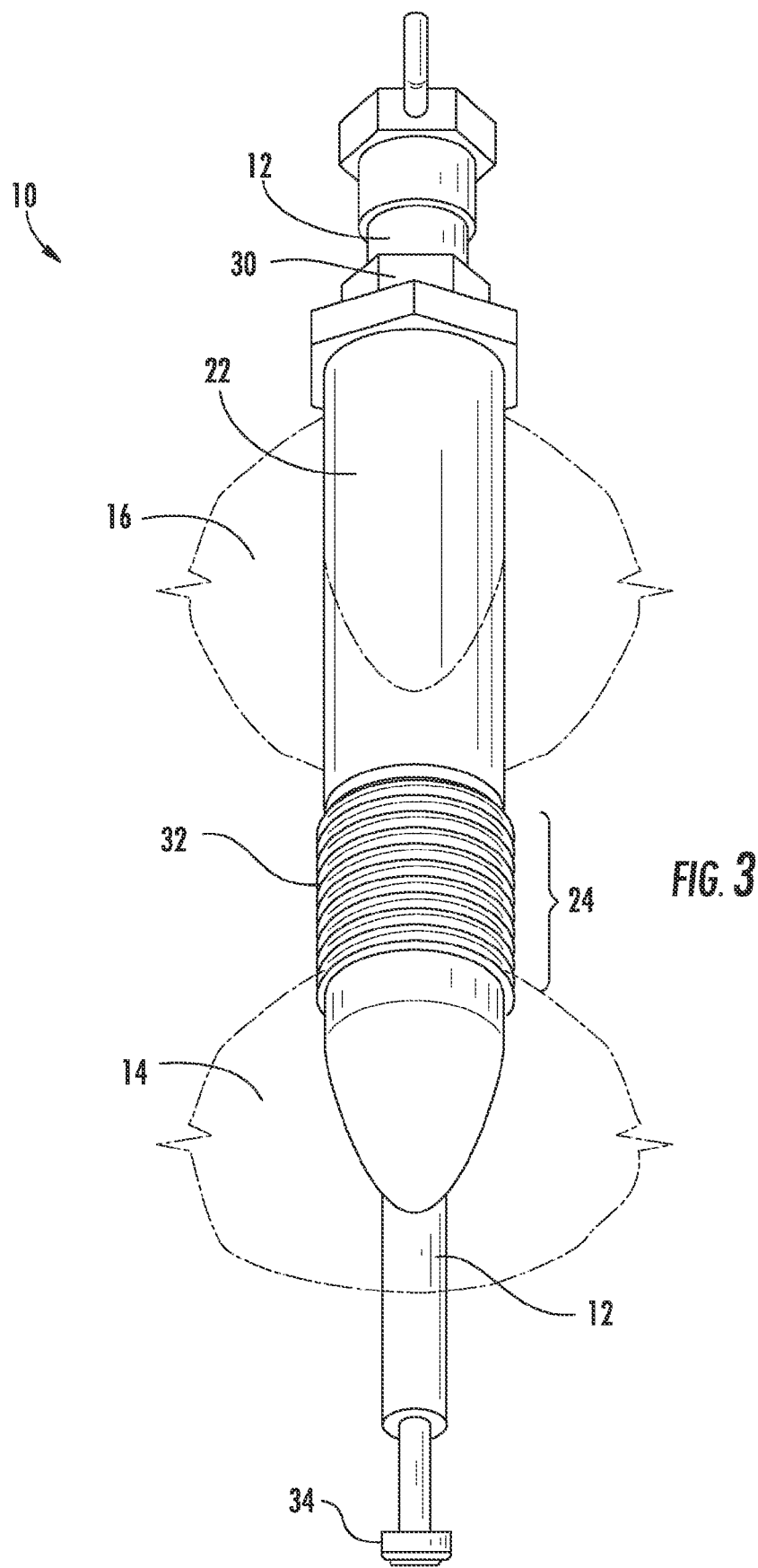
FIG. 3 is a top plan view of the system shown in FIG. 1.

FIG. 1 shows a perspective view; FIG. 2 shows a side cross-section view, and FIG. 3 shows a top plan view of the system 10 according to one embodiment of the present invention. As shown, the system 10 may include a first collar 18, a second collar 20, a sensor support 22, and means 24 for allowing movement between the sensor support 22 and one or both of the collars 18, 20. The collars 18, 20, sensor support 22, and means 24 for allowing movement between the sensor support 22 and the collars 18, 20 generally define a passage through which the sensor 12 may be inserted. In this manner, the sensor support 22 may hold the sensor 12 fixedly in place, and the sensor support 22 and/or the means 24 for allowing movement between the sensor support 22 and the collars 18, 20 may provide a sealing engagement with one or both collars 18, 20 to reduce and/or prevent fluid from leaking past the inner barrier 14.

The first and second collars 18, 20 are generally configured for engagement with or connected to the inner and outer barriers 14, 16. The collars 18, 20 may comprise a metallic plate or other material suitable for the intended environment that may be glued, riveted, bolted, screwed, welded or otherwise engaged with or attached to the respective barriers 14, 16. The collars 18, 20 are generally referred to as the first collar 18 and the second collar 20 for convention and clarity in this description. However, one of ordinary skill in the art will appreciate that either collar may be engaged with or attached to the inner barrier 14, with the other collar engaged with or attached to the outer barrier 16. For example, the first collar 18 may be engaged with or attached to the inner barrier 14, and the second collar 20 may be engaged with or attached to the outer barrier 16. Alternately, the first collar 18 may be engaged with or attached to the outer barrier 16, and the second collar 20 may be engaged with or attached to the inner barrier 14. In this manner, the collars 18, 20 individually or collectively may provide an attachment point for the sensor support 22 and/or the means 24 for allowing movement between the sensor support 22 in the collars 18, 20.

The sensor support 22 generally comprises a hollow tube through which the sensor 12 may be inserted. Although illustrated as a cylindrical tube in FIGS. 1-3, the specific shape or geometry of the sensor support 22 is not a limitation of the present invention unless specifically recited in the claims. The sensor support 22 generally extends through either or both of the collars 18, 20, depending on the particular embodiment. For example, as shown in FIGS. 1-3, the sensor support 22 extends through the second collar 20 which in turn is engaged with the outer barrier 16. The sensor support 22 may be press fit, glued, bolted, riveted, welded, or otherwise fixedly connected to the associated collar 20 to provide a sealing engagement between the sensor support 22 and the associated collar 20 while also providing a stable and secure platform for the sensor 12. The sensor support 22 may further include a fitted flange 28 and/or mounting bolt 30 for securely holding the sensor 12 in place. Alternately, or in addition, as shown in FIG. 2, a threaded engagement 26 between the sensor support 22 and the sensor 12 may be used to securely hold the sensor 12 in place. In this manner, the threaded engagement 26, the fitted flange 28, and/or the mounting bolt 30 may allow for precise positioning of the sensor 12 as desired.

The means 24 for allowing movement between the sensor support 22 and one or both of the collars 18, 20 may be connected to the sensor support 22 to absorb or allow radial and/or axial movement between the sensor support 22 and one or both of the collars 18, 20. The means 24 may comprise a diaphragm, bellows, piston, articulated linkage, or other suitable structure known to one of ordinary skill in the art for allowing relative movement between two components. For example, as shown in FIGS. 1-3, the means may comprise a collapsible coupling 32 made from, for example, convoluted or folded sheet metal or other suitable material capable of withstanding the intended environment and that is sufficiently flexible to extend and contract radially and/or axially. The collapsible coupling 32 may be in sealing engagement with the first collar 18 which in turn is engaged with the inner barrier 14. In particular embodiments, the collapsible coupling 32 may be may be press fit, glued, bolted, riveted, welded, or otherwise fixedly connected to the associated collar 18.

The system 10 described and illustrated with respect to FIGS. 1-3 may thus be used to position the sensor 12 through the inner barrier 14 and the outer barrier 16. For example, the sensor may comprise an optical probe 34 to be positioned near the trailing edge of a rotating bucket in a turbine. The first and second collars 18, 20 may be engaged with, bolted to, or attached to the inner and outer barriers 14, 16, respectively. The sensor support 22 may be connected to the collapsible coupling 32 and/or the second collar 20, and the collapsible coupling 32 may be in sealing engagement with the first collar 18. The optical probe 34 on the sensor 12 may thus be inserted through the sensor support 22, collapsible coupling 32, and first and second collars 18, 20 and positioned by the threaded engagement 26, fitted flange 28, and/or the mounting bolt 30, as desired. As the turbine operates and the inner barrier 14 expands or contracts axially and/or radially, the collapsible coupling 32 absorbs or allows axial and/or radial movement between the inner collar 18 and the sensor support 22 so that the position of the sensor 12, and thus the optical probe 34, remains unchanged. In addition, the sealing engagement between the collapsible coupling 32 and the first collar 18 reduces or prevents any combustion gases from escaping through the inner barrier 14 and heating up the space between the inner barrier 14 and the outer barrier 16.

Figure 4:
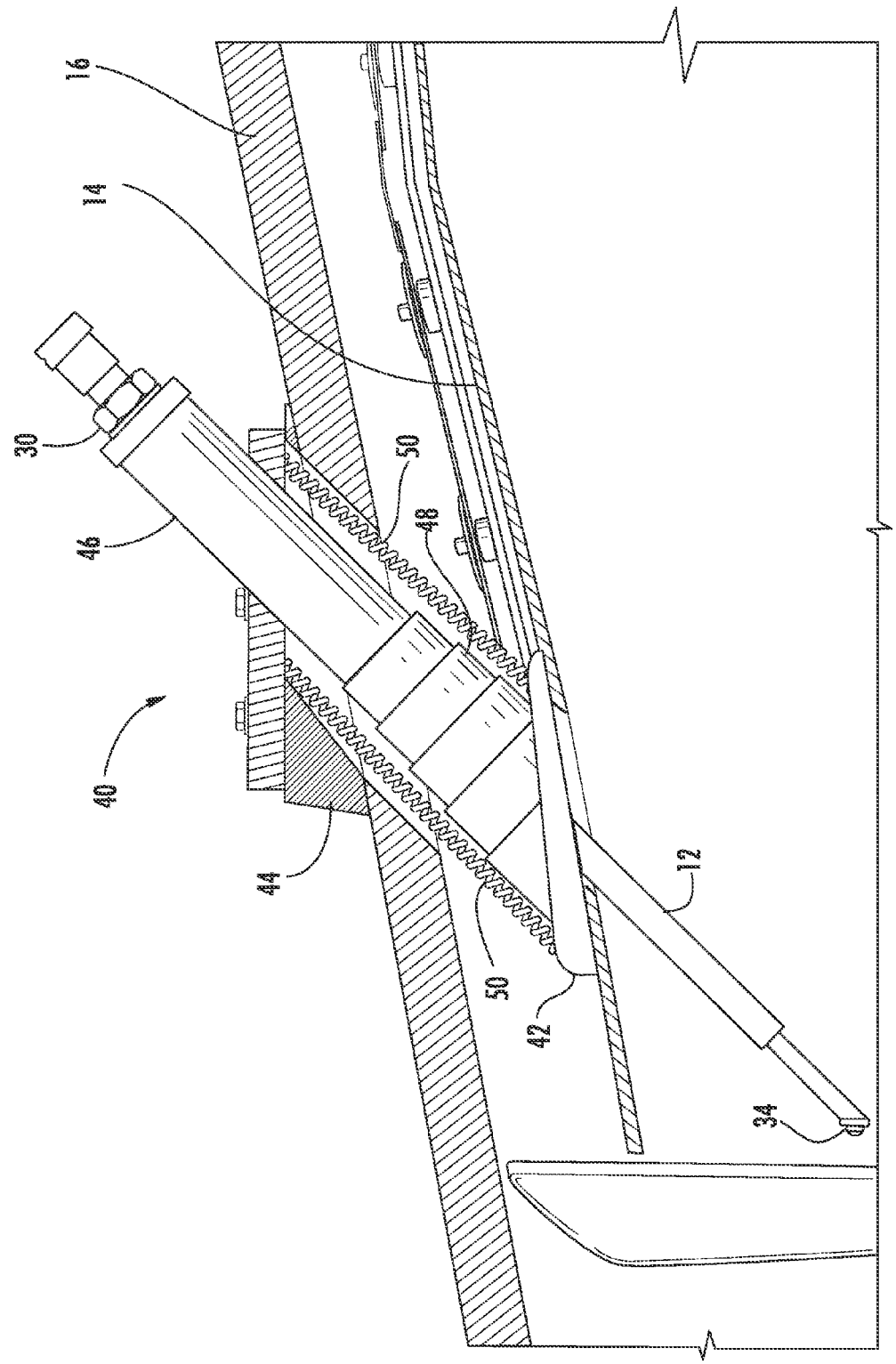
FIG. 4 is a perspective view of a system according to an alternate embodiment of the present invention.

FIG. 4 provides a perspective view of a system 40 according to an alternate embodiment of the present invention. The system 40 again includes first and second collars 42, 44, a sensor support 46, and a collapsible coupling 48 as previously described with respect to the embodiment shown in FIGS. 1-3. In this particular embodiment, however, the collapsible coupling 48 comprises a telescoping fitting in sealing engagement with the first collar 42. In addition, one or more bias members 50 may be operatively connected to the first collar 42 to bias the first collar 42 away from the sensor support 46. The bias members may comprise springs, push rods, pistons, solenoids, or other mechanical or electromechanical devices known to one of ordinary skill in the art for moving one component with respect to another. In this manner, the telescoping fitting absorbs or allows axial and/or radial movement of the inner barrier 14 so that the position of the sensor 12 remains unchanged. In addition, the bias members 50 ensure that the first collar 42 remains engaged with the inner barrier 14 to reduce or prevent any fluids from escaping through the inner barrier 14 and heating up the space between the inner barrier 14 and the outer barrier 16.

The embodiments previously described and illustrated with respect to FIGS. 1-4 may also provide a method for positioning the sensor 12 through the inner barrier 14 and the outer barrier 16. The method generally includes engaging the first collar 18 to at least one of the inner barrier 14 or the outer barrier 16 and inserting the sensor support 22 connected to the collapsible coupling 32 through the outer barrier 16. The method may further include connecting at least one of the sensor support 22 or the collapsible coupling 32 to the first collar 18 and inserting the sensor 12 through the sensor support 22. In particular embodiments, the method may further include biasing the first collar 18 away from the sensor support 22 and/or engaging the first collar 18 to the inner barrier 14 and engaging the second collar 20 to the second barrier 16. Alternately, or in addition, the method may further include threading or fixedly connecting the sensor support 22 in the second collar 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for positioning a sensor through an inner barrier and an outer barrier comprising:
   a. a first collar configured for engagement with at least one of the inner barrier or the outer barrier;
   b. a collapsible coupling;
   c. a sensor support connected to said collapsible coupling;
   d. wherein at least one of said collapsible coupling or said sensor support is in sealing engagement with said first collar; and
   e. wherein said first collar, said collapsible coupling, and said sensor support define a passage therethrough.

2. The system as in claim 1, wherein at least one of said collapsible coupling or said sensor support is fixedly connected to said first collar.

3. The system as in claim 1, wherein said collapsible coupling comprises a telescoping fitting.

4. The system as in claim 1, further comprising a bias member operatively connected to said first collar to bias said first collar away from said sensor support.

5. The system as in claim 1, wherein said first collar is configured for engagement with the inner barrier and further comprising a second collar configured for engagement with the outer barrier.

6. The system as in claim 5, wherein said sensor support is fixedly connected to said second collar.

7. The system as in claim 5, further comprising a threaded engagement between said sensor support and said sensor.

8. A system for positioning a sensor through an inner barrier and an outer barrier comprising:
   a. a first collar configured for engagement with at least one of the inner barrier or the outer barrier;
   b. a sensor support fixedly connected to said first collar, wherein said first collar and said sensor support define a passage therethrough; and
   c. means for allowing movement between said sensor support and said first collar.

9. The system as in claim 8, further comprising a collapsible coupling connected to said sensor support.

10. The system as in claim 8, wherein said first collar is configured for engagement with the inner barrier and further comprising a second collar configured for engagement with the outer barrier.

11. The system as in claim 10, wherein said sensor support is fixedly connected to said second collar.

12. The system as in claim 10, further comprising a threaded engagement between said sensor support and said sensor.

13. The system as in claim 8, further comprising a bias member operatively connected to said first collar to bias said first collar away from said sensor support.

14. A method for positioning a sensor through an inner barrier and an outer barrier comprising:
   a. engaging a first collar to at least one of the inner barrier or the outer barrier;
   b. inserting a sensor support connected to a collapsible coupling through the outer barrier;
   c. connecting at least one of said sensor support or said collapsible coupling to said first collar; and
   d. inserting the sensor through said sensor support.

15. The method as in claim 14, further comprising biasing said first collar away from said sensor support.

16. The method as in claim 14, further comprising engaging said first collar to the inner barrier and engaging a second collar to the second barrier.

17. The method as in claim 14, further comprising threading said sensor in said sensor support.

18. The method as in claim 14, further comprising fixedly connecting said sensor support to a second collar.

\* \* \* \* \*